United States Patent
Takahashi et al.

(10) Patent No.: US 10,741,211 B2
(45) Date of Patent: Aug. 11, 2020

(54) INFORMATION PROCESSING DEVICE, INFORMATION RECORDING MEDIUM, AND INFORMATION PROCESSING METHOD

(71) Applicant: SONY CORPORATION, Tokyo (JP)

(72) Inventors: Ryohei Takahashi, Kanagawa (JP); Kouichi Uchimura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 255 days.

(21) Appl. No.: 15/533,592

(22) PCT Filed: Nov. 13, 2015

(86) PCT No.: PCT/JP2015/082032
§ 371 (c)(1),
(2) Date: Jun. 6, 2017

(87) PCT Pub. No.: WO2016/103968
PCT Pub. Date: Jun. 30, 2016

(65) Prior Publication Data
US 2017/0352374 A1 Dec. 7, 2017

(30) Foreign Application Priority Data
Dec. 22, 2014 (JP) ................. 2014-258349

(51) Int. Cl.
*G11B 20/10* (2006.01)
*H04N 21/431* (2011.01)
(Continued)

(52) U.S. Cl.
CPC .............. *G11B 20/10* (2013.01); *G11B 27/00* (2013.01); *G11B 27/309* (2013.01);
(Continued)

(58) Field of Classification Search
None
See application file for complete search history.

(56) References Cited

U.S. PATENT DOCUMENTS

2009/0157750 A1   6/2009  Kim et al.
2011/0115935 A1*  5/2011  Myung ................. H04N 5/232
                                                      348/222.1
(Continued)

FOREIGN PATENT DOCUMENTS

CN    101253566 A    8/2008
CN    104509094 A    4/2015
(Continued)

OTHER PUBLICATIONS

International Search Report and Written Opinion of PCT Application No. PCT/JP2015/082032, dated Dec. 22, 2015, 02 pages of English Translation and 07 pages of ISRWO.
(Continued)

*Primary Examiner* — Heather R Jones
(74) *Attorney, Agent, or Firm* — Chip Law Group

(57) ABSTRACT

To enable an HDR image and an HDR image metadata to be stored in an MP4 file, and a reproduction device to reproduce an optimum HDR image based on metadata. In generating the MP4 file that stores HDR image data, the HDR image metadata is recorded in the MP4 file. An HDR image metadata storage box is set to a trak box or a traf box in the MP4 file, and the HDR image metadata is stored. The reproduction device acquires the HDR image metadata stored in the MP4 file, determines whether executing a conversion process of the HDR image read from the MP4 file according to the acquired metadata and display function information of the display unit, and executes an output image generation process according to a determination result.

15 Claims, 11 Drawing Sheets

(51) Int. Cl.
*H04N 9/82* (2006.01)
*G11B 27/30* (2006.01)
*H04N 5/76* (2006.01)
*H04N 21/4402* (2011.01)
*G11B 27/00* (2006.01)
*H04N 21/435* (2011.01)
*H04N 9/87* (2006.01)

(52) U.S. Cl.
CPC ........... *G11B 27/3027* (2013.01); *H04N 5/76* (2013.01); *H04N 9/8205* (2013.01); *H04N 9/87* (2013.01); *H04N 21/431* (2013.01); *H04N 21/435* (2013.01); *H04N 21/4402* (2013.01); *H04N 21/440236* (2013.01)

(56) References Cited

U.S. PATENT DOCUMENTS

| | | |
|---|---|---|
| 2012/0288208 A1 | 11/2012 | Katsumata et al. |
| 2014/0125696 A1 | 5/2014 | Newton et al. |
| 2014/0210847 A1* | 7/2014 | Knibbeler .............. G09G 5/006 345/589 |
| 2014/0225941 A1 | 8/2014 | Van Der Vieuten et al. |
| 2015/0208078 A1 | 7/2015 | Takahashi et al. |

FOREIGN PATENT DOCUMENTS

| | | |
|---|---|---|
| EP | 2523460 A1 | 11/2012 |
| EP | 2721811 A1 | 4/2014 |
| EP | 2745290 A1 | 6/2014 |
| EP | 2745507 A1 | 6/2014 |
| EP | 2869567 A1 | 5/2015 |
| JP | 2007-324722 A | 12/2007 |
| JP | 2009-506475 A | 2/2009 |
| JP | 2011-142585 A | 7/2011 |
| JP | 2014-131307 A | 7/2014 |
| JP | 2014-528182 A | 10/2014 |
| JP | 2014-531821 A | 11/2014 |
| JP | 2017-183762 A | 10/2017 |
| KR | 10-2005-0092688 A | 9/2005 |
| KR | 10-2006-0100344 A | 9/2006 |
| TW | 201513641 A | 4/2015 |
| WO | 2007/027066 A1 | 3/2007 |
| WO | 2011/083625 A1 | 7/2011 |
| WO | 2012/172460 A1 | 12/2012 |
| WO | 2013/046095 A1 | 4/2013 |
| WO | 2013/046096 A1 | 4/2013 |
| WO | 2015/008684 A1 | 1/2015 |

OTHER PUBLICATIONS

Extended European Search Report of EP Patent Application No. 15872537.4, dated Jul. 17, 2018, 07 pages.

Office Action for JP Patent Application No. 2016-566028, dated Jul. 23, 2019, 08 pages of Office Action and 05 pages of English Translation.

* cited by examiner

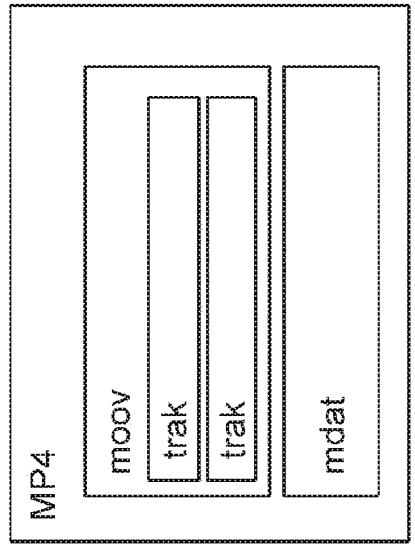
FIG. 1(b) NON-FRAGMENT TYPE (non-fragmented movie)
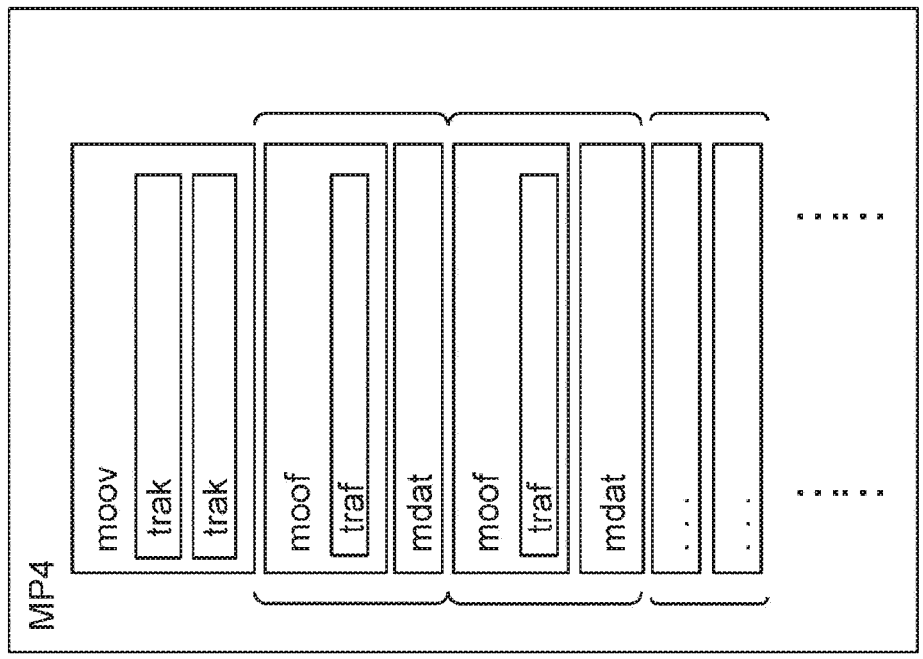
FIG. 1(a) FRAGMENT TYPE (fragmented movie)

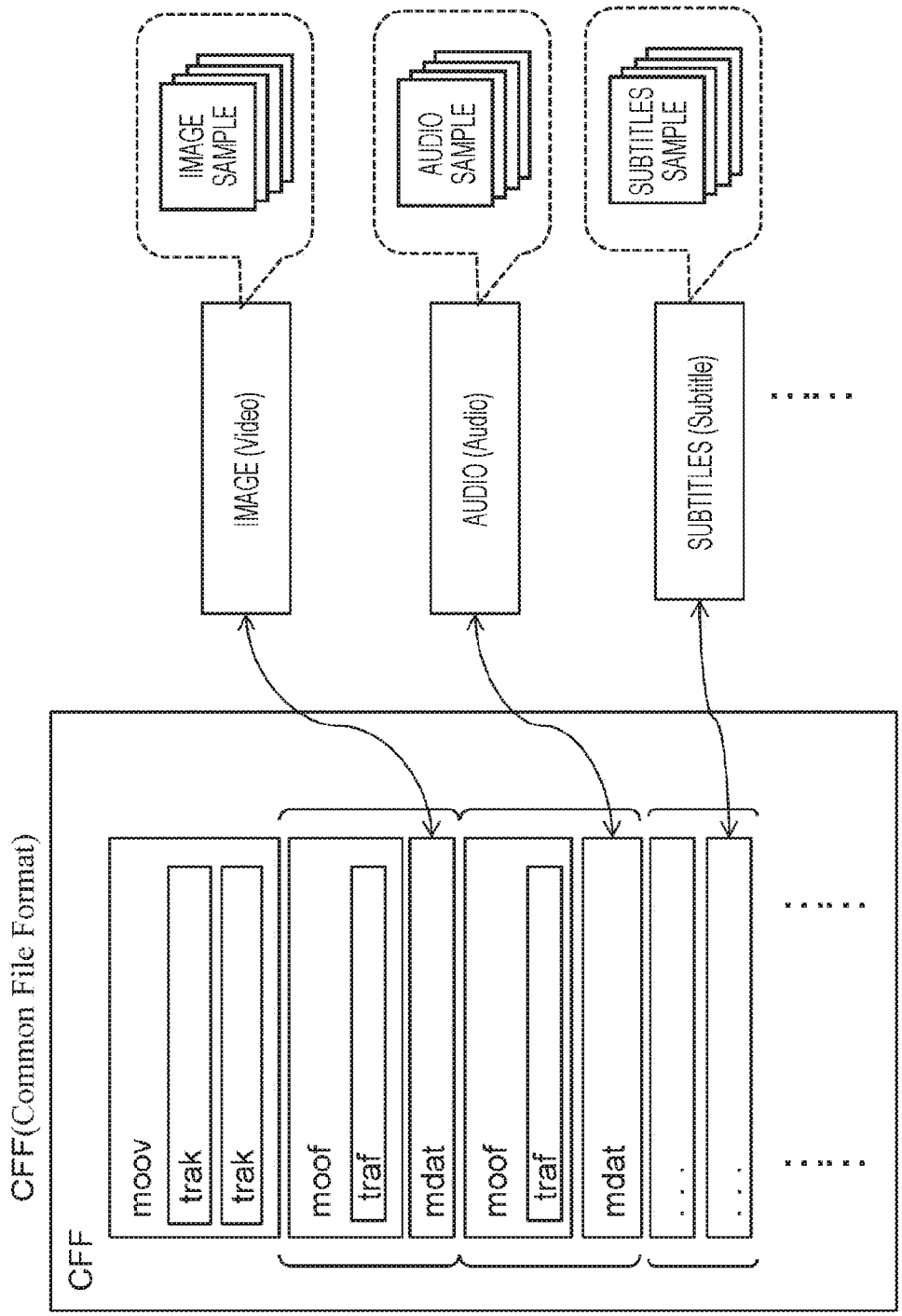

FIG. 5(A)

DEFINITION OF HDR METADATA BOX (hdrm)

HDR Metadata Box ('hdrm')
Box Type 'hdrm'
Container Track Box ('trak') or Track Fragment Box ('traf')
Mandatory No
Quantity Zero or one FIG. 5(B) SPECIFIC EXAMPLES OF RECORDED DATA IN HDR METADATA BOX (hdrm)

| DATA | MEANING |
|---|---|
| unsigned int (5) metadata_id | METADATA IDENTIFIER (ID) |
| unsigned int (3) EOTF | EOTF INFORMATION OF CONTENT |
| unsigned int(16) display_primaries_x[0] | COLOR INFORMATION CALCULATED ACCORDING TO DISPLAY USED AT THE TIME OF CONTENT EDITING (AUTHORING) [Mastering display color volume SEI INFORMATION] |
| unsigned int(16) display_primaries_y[0] | |
| unsigned int(16) display_primaries_x[1] | |
| unsigned int(16) display_primaries_y[1] | |
| unsigned int(16) display_primaries_x[2] | |
| unsigned int(16) display_primaries_y[2] | |
| unsigned int(16) white_point_x | |
| unsigned int(16) white_point_y | |
| unsigned int(16) max_display_mastering_luminance | |
| unsigned int(16) min_display_mastering_luminance | |
| unsigned int(16) Maximum Content Light Level | MAXIMUM LUMINANCE OF CONTENT |
| unsigned int(16) Maximum Frame-average Light Level | MAXIMUM VALUE OF FRAME AVERAGE LUMINANCE OF CONTENT |

INFORMATION PROCESSING DEVICE, INFORMATION RECORDING MEDIUM, AND INFORMATION PROCESSING METHOD

CROSS REFERENCE TO RELATED APPLICATIONS

This application is a U.S. National Phase of International Patent Application No. PCT/JP2015/082032 filed on Nov. 13, 2015, which claims priority benefit of Japanese Patent Application No. JP 2014-258349 filed in the Japan Patent Office on Dec. 22, 2014. Each of the above-referenced applications is hereby incorporated herein by reference in its entirety.

TECHNICAL FIELD

The present disclosure relates to an information processing device, an information recording medium, an information processing method, and a program. In more details, the present disclosure relates to an information processing device, an information recording medium, an information processing method, and a program for recording a high dynamic range (HDR) image according to an MP4 format to make the image reproducible.

BACKGROUND ART

Currently, various recording media such as disks and flash memories are used as recording media of various types of content such as movies.

There are various types of data recording formats for the recording media. For example, there is an MP4 format (hereinafter, called MP4) as a data recording format standardized in consideration of use by portable terminals such as smart phones and tablet terminals.

Many of the portable terminals have a reproduction application that can reproduce MP4 data recorded in the MP4 format. Therefore, content is required to be recorded in the MP4 format when recorded in a medium of the portable terminal.

Note that, the MP4 format is described in Patent Document 1 (JP 2014-131307 A), and the like.

Meanwhile, in recent years, content including a high dynamic range (HDR) image with extended color gamut and an extended contrast ratio to be output to a display has been widely used. The HDR image has wider expressible color gamut and a larger contrast ratio settable than a standard dynamic range (SDR) image widely used in the current 2K support displays, and can express an image close to reality seen with the naked eyes.

However, many of the displays of televisions, portable terminals, and the like currently typically used can output only the SDR image, and few displays can output the HDR image.

In the future, spread of displays that can output not only a 4K image but also the HDR image is expected.

In a case of recording the HDR image content as MP4 format data, metadata (attribute information) specific to the HDR image needs to be recorded within the MP4 file in which the MP4 format data is stored.

However, at this time, a specific definition about a metadata recording configuration of the HDR image for the MP4 file has not yet been established.

CITATION LIST

Patent Document

Patent Document 1: Japanese Patent Application Laid-Open No. 2014-131307

SUMMARY OF THE INVENTION

Problems to be Solved by the Invention

The present disclosure has been made in view of such a problem, and an objective is to provide an information processing device, an information recording medium, an information processing method, and a program for recording a high dynamic range (HDR) image according to an MP4 format to make the image reproducible.

Solutions to Problems

A first aspect of the present disclosure lies in an information processing device including:
a data processing unit configured to read high dynamic range (HDR) image data from an MP4 file that stores data according to an MP4 format and output the HDR image data to a display unit, wherein
the data processing unit
acquires HDR image metadata as metadata regarding the HDR image data stored in the MP4 file,
determines whether executing a conversion process of an HDR image read from the MP4 file according to the acquired HDR image metadata and display function information of the display unit, and executes an output image generation process according to a determination result.

Further, a second aspect of the present disclosure lies in an information processing device including:
a data processing unit configured to generate an MP4 file that stores high dynamic range (HDR) image data according to an MP4 format, wherein
the data processing unit generates or acquires HDR image metadata as metadata regarding the HDR image data stored in the MP4 file, and sets an HDR image metadata storage box in the MP4 file, and stores the HDR image metadata in the set HDR image metadata storage box.

Further, a third aspect of the present disclosure lies in an information recording medium that records an MP4 file that stores data according to an MP4 format,
the information recording medium including:
an mdat box that stores high dynamic range (HDR) image data; and
an HDR image metadata storage box that stores HDR image metadata as metadata corresponding to the HDR image, as recorded data,
information recording medium enabling
a reproduction device, which reads and reproduces HDR image data from the MP4 file, to determine whether executing a conversion process of an image on the basis of the HDR image metadata read from the HDR image metadata storage box.

Further, a fourth aspect of the present disclosure lies in an information processing method executed in an information processing device,
the information processing device including a data processing unit that reads high dynamic range (HDR) image data from an MP4 file that stores data according to an MP4 format, and outputs the HDR image data to a display unit, the data processing unit being configured to acquire HDR image metadata as metadata regarding the HDR image data stored in the MP4 file, and determine whether executing a conversion process of an HDR image read from the MP4 file according to the acquired HDR image metadata and display function information of the display unit, and execute an output image generation process according to a determination result.

Further, a firth aspect of the present disclosure lies in an information processing method executed in an information processing device, the information processing device including a data processing unit that generates an MP4 file that stores high dynamic range (HDR) image data according to an MP4 format, the data processing unit being configured to generate or acquire HDR image metadata as metadata regarding the HDR image data stored in the MP4 file, and set an HDR image metadata storage box in the MP4 file, and store the HDR image metadata to the set HDR image metadata storage box.

Further, a sixth aspect of the present disclosure lies in a program for causing an information processing device to execute an information process, the program causing a data processing unit of the information processing device to execute a data process of reading high dynamic range (HDR) image data from an MP4 file that stores data according to an MP4 format, and outputting the HDR image data to a display unit, the program causing the data processing unit, in the data process, to acquire HDR image metadata as metadata regarding the HDR image data stored in the MP4 file, and to determine whether executing a conversion process of an HDR image read from the MP4 file according to the acquired HDR image metadata and display function information of the display unit, and to execute an output image generation process according to a determination result.

Further, a seventh aspect of the present disclosure lies in a program for causing an information processing device to execute an information process, the program causing a data processing unit of the information processing device to execute a data process of generating an MP4 file that stores high dynamic range (HDR) image data according to an MP4 format, the program causing the data processing unit, in the data process, to generate or acquire HDR image metadata as metadata regarding the HDR image data stored in the MP4 file, and to set an HDR image metadata storage box in the MP4 file, and to execute a process of storing the HDR image metadata to the set HDR image metadata storage box.

Note that the program of the present disclosure is, for example, a program that can be supplied to an information processing device or a computer system capable of executing various program codes, by a recording medium or a communication medium in a computer-readable format. By supplying the program in the computer-readable format, a process according to the program is realized on the information processing device or the computer system.

Other objectives, features, and advantages of the present disclosure will become clear in more detailed description of embodiments and the appended drawings of the present disclosure to be described below. Note that, in the present specification, a system is a logical set configuration of a plurality of devices and is not limited to a configuration in which the plurality of devices is located in the same casing.

Effects of the Invention

According to a configuration of an embodiment of the present disclosure, the HDR image and the HDR image metadata are stored in the MP4 file, and the reproduction device can reproduce an optimum HDR image based on metadata.

To be specific, for example, in generating the MP4 file in which the HDR image data is stored, the HDR image metadata is recorded in the MP4 file. The HDR image metadata storage box is set in the trak box or the traf box in the MP4 file, and the HDR image metadata is stored. The reproduction device acquires the HDR image metadata stored in the MP4 file, determines whether executing the conversion process of the HDR image read from the MP4 file according to the acquired metadata and the display function information of the display unit, and executes the output image generation process according to the determination result.

With the present configuration, the HDR image and the HDR image metadata are stored in the MP4 file, and the reproduction device can reproduce the optimum HDR image based on metadata.

Note that the effects described in the present specification are mere examples and are not limited, and additional effects may be exhibited.

BRIEF DESCRIPTION OF DRAWINGS

FIGS. 1(a) and 1(b) are diagrams illustrating an MP4 format.

FIG. 2 is a diagram illustrating a configuration of a common file format (CFF).

FIGS. 5(A) and 5(B) are diagrams illustrating a definition and a configuration example of metadata regarding a high dynamic range (HDR) image.

MODE FOR CARRYING OUT THE INVENTION

Figure 3:
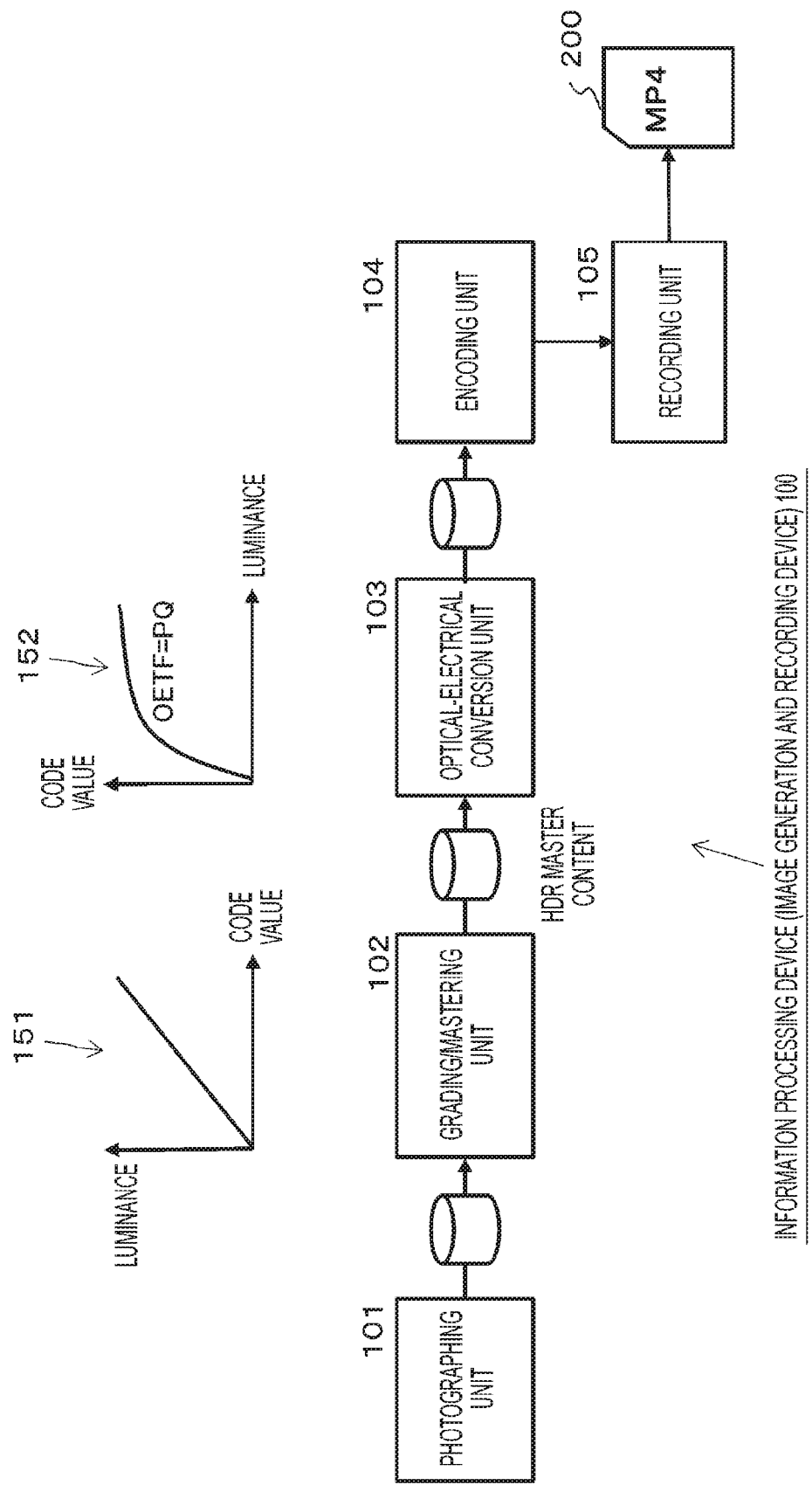
FIG. 3 is a diagram illustrating a configuration and a process example of an information processing device that generates and records MP4 format data.

Hereinafter, details of an information processing device, an information recording medium, an information processing method, and a program of the present disclosure will be described with reference to the drawings. Note that the description will be given according to the following items:

1. MP4 format;
2. High dynamic range (HDR) image;

3. Outline of HDR image metadata storage configuration in MP4 format of present disclosure;

4. Specific storage example of HDR image metadata in MP4 format data;

4-1. (First Example) Example of setting HDR image metadata storage box [hdrm box] only to trak box in moov box in MP4 format data;

4-2. (Second Example) Example of setting HDR image metadata storage box [hdrm box] to both trak box in moov box and traf box in moof box in MP4 format data;

4-3. (Third Example) Example of setting HDR image metadata storage box [hdrm box] only to traf box in moof box in MP4 format data;

5. MP4 file generation and recording processes executed by information processing device and data reproduction process sequence from MP4 file;

6. Example of Hardware Configuration of Information Processing Device; and

7. Conclusion of Configurations of Present Disclosure.

[1. MP4 Format]

First, an MP4 format will be described.

The MP4 format is a format defined in ISO/IECC 14496-14, and is a format suitable when recording data in flash memory, for example.

The MP4 format is used in recording encoded data that is content configuration data such as an image (video), audio, and subtitles, and metadata (attribute information) regarding the aforementioned data in a recording medium.

Further, the MP4 format is also used as a data storage format of data transmitted through broadcast waves or a network.

Many of currently used portable terminals have a reproduction application that can reproduce MP4 data recorded according to the MP4 format, and thus content is required to be recorded in the MP4 format when recorded in a medium of the portable terminal.

An outline of the MP4 format will be described with reference to FIGS. 1(a) and 1(b) and FIG. 2.

FIGS. 1(a) and 1(b) illustrate the following two examples as examples of the MP4 format defined in ISO/IEC 14496-14:

FIG. 1(a) fragmented (fragment type) MP4 file (fragmented movie); and

FIG. 1(b) non-fragmented (non-fragment type) MP4 file (Non-fragmented movie).

The MP4 files illustrated in FIGS. 1(a) and 1(b) are files that are set in one processing unit in a data recording or reproducing process according to the MP4 format.

(a) The fragmented (fragment type) MP4 file (fragmented movie) is a file format in which data such as an image or audio, which is data to be reproduced, is fragmented into pieces of reproduced data within a predetermined time and stored.

(b) The non-fragmented (non-fragment type) MP4 file (non-fragmented movie) is a file format in which data such as an image or audio, which is data to be reproduced, is stored without fragmentation.

In the MP4 file, regions are set in units of boxes and data defined in the units of boxes is stored in each box.

Each box includes regions of a box size (box-size), a box type (box-type), and box data (box-data).

A data length (byte size) of the box is recorded in the box size.

A type of data to be stored in the box is recorded in the box type (box-type).

The type of data indicated by the box type is recorded in the box data (box-data).

In the fragmented (fragment type) MP4 file illustrated in FIG. 1(a), the following types of boxes are set:

a moov box;

a trak box;

a moof box;

a traf box; and a mdat box.

The above boxes are set.

Actual data as data to be reproduced, such as an image, audio, and subtitles, is fragmented and stored in the mdat box.

In addition, the moof box is associated with each mdat box, and metadata such as attribute information and reproduction control information regarding the fragmented actual data stored in the mdat box associated with the moof box is stored in the moof box.

The fragmented (fragment type) MP4 file illustrated in FIG. 1(a) has a configuration in which a plurality of set data is stored in the moov box, each set data including, as one set data, actual data (mdat) that is fragmented data of the data to be reproduced and metadata (moof) corresponding to the fragmented actual data, and metadata regarding the plurality of stored set data as a whole is stored in the moov box.

The traf box is set inside the metadata (moof) corresponding to the fragmented actual data.

The metadata such as the reproduction control information and the attribute information of the actual data stored in the mdat box associated with the traf box is stored in the traf box.

The moov box is a box set as a storage region of the metadata (the reproduction control information and the attribute information) of data stored in the entire MP4 file.

One or more trak boxes are set inside the moov box. The trak box can be set according to, for example, the types of data such as an image, audio, and subtitles and stores the metadata of the data.

Note that, in a case where a plurality of different image data, e.g., a 2K image or and a 4K image, is included in the reproduced data stored in the MP4 file, individual trak boxes can be set according to the types of images.

Further, in a case where a plurality of different audio data, e.g., Japanese audio and English audio, is included in the audio data stored in the MP4 file, individual trak boxes can be set according to the types of audio.

Similarly, in a case where a plurality of different subtitles data, e.g., Japanese subtitles or English subtitles, is included in the subtitles data stored in the MP4 file, individual trak boxes can be set according to the types of subtitles.

FIG. 1(b) The non-fragmented (non-fragment type) MP4 file (Non-fragmented movie) is a file format in which data such as an image or audio, which is data to be reproduced, is stored without fragmentation.

In the non-fragmented (non-fragment type) MP4 file illustrated in FIG. 1(b), the following types of box are set:

a moov box;

a trak box; and a mdat box.

The above boxes are set.

In the mdat box, actual data to be reproduced is stored.

In the moov box, metadata set corresponding to the actual data (mdat) as the data to be reproduced, e.g., metadata including attributes of the actual data (mdat) to be reproduced and the reproduction control information, is stored.

In the trak box set inside the moov box, reproduction sequence information and the like of the actual data (mdat) is stored.

Similarly to the (a) fragmented (fragment type) MP4 file described above, one or more trak boxes are set inside the moov box set in the (b) non-fragmented (non-fragment type) MP4 file. Each trak box is set according to, for example, the types of data such as an image, audio, and subtitles.

FIGS. 1(a) and 1(b) illustrate a basic configuration example of the MP4 format.

Digital Entertainment Content Ecosystem (DECE) that is a standardization association regarding the MP4 format has standardized a common file format (CFF) as a new file format of MP4 base. The CFF will be described with reference to FIG. 2.

The common file format (CFF) illustrated in FIG. 2 basically has the data configuration similar to the fragment-type (fragmented movie) MP4 described with reference to FIG. 1(a).

That is, the following boxes are set in the common file format (CFF) file illustrated in FIG. 2, similarly to the fragmented (fragment type) MP4 file of FIG. 1(a):
 a moov box;
 a trak box;
 a moof box;
 a traf box; and
 a mdat box.

The above boxes are set.

Stored data in each box is substantially the same as those of the fragmented (fragment type) MP4 file in FIG. 1(a).

However, in the CFF, a restriction that only one type of data is stored in each mdat box is provided.

That is, one type of data, of the following data, is stored in each mdat box:
 (a) image;
 (b) audio; and
 (c) subtitles.

There is a restriction that the data of the above (a) to (c) cannot be mixed and stored.

Note that, in a case where a plurality of different image data, e.g., an HD image and a 4K image, is included in the CFF file, such different images are stored in different mdat boxes.

Similarly, different audio data, e.g., Japanese audio and English audio, are also stored in individual mdat boxes, and Japanese subtitles, English subtitles, and the like are also stored in different mdat boxes.

In the general fragmented (fragment type) MP4 file illustrated in FIG. 1(a), different types of data such as an image, audio, and subtitles are permitted to be mixed and stored in the mdat box set as a storage box of one fragmented data (fragment).

However, in the common file format (CFF) illustrated in FIG. 2, the restriction that only one type of data is stored in one mdat box is provided.

That is, only one type of data, i.e., one of an image, audio, and the subtitles, is individually stored in each mdat box.

Therefore, the moof box that is a metadata storage region corresponding to the mdat box is also set to store the metadata set corresponding to one type of data, i.e., one of an image, audio, and subtitles.

Note that the stored data of the mdat box that is a data portion of the MP4 format is divided to a sample that is a basic data unit.

In the common file format (CFF), a set of the same type of data samples, i.e., a set of only image samples, a set of only audio samples, or a set of only subtitle samples, is stored in one mdat box.

Further, in the CFF defined by DECE, encoding modes (codec) and data formats of an image, audio, and subtitles permitted to be stored in a CFF file are also defined.

Examples of the data formats permitted to be stored in the CFF file include the following data formats:
 image (video): AVC (MPEG-4 AVC) and HEVC (MPEG-4 HEVC); audio: MPEG-4-AAC, Dolby, and AC-3; and subtitles: SMPTE Timed Text (SMPTE-TT).

[2. High Dynamic Range (HDR) Image]

Next, a high dynamic range (HDR) image will be described.

In recent years, content including high dynamic range (HDR) images with extended color gamut and an extended contrast ratio to be output to a display has been widely used. The HDR images have wider expressible color gamut and a larger contrast ratio settable than standard dynamic range (SDR) images widely used in the current 2K support displays, and can express images close to reality seen with the naked eyes.

In a case of recording the HDR image content as the MP4 format data, the metadata (attribute information) specific to the HDR image needs to be recorded in the MP4 file that is a storage file of the MP4 format data.

However, at this time, the definition about a recording form of the metadata of the HDR image to the MP4 file has not yet been established.

An example of generation and reproduction processes of the HDR content will be described with reference to FIGS. 3 and 4.

FIG. 3 illustrates a configuration example of an information processing device 100 that executes a generation process and a recording process of the HDR content.

A photographing unit 101 includes a 4K camera, for example, and records a color image in a wide color gamut color system based on the ITU-R Recommendation BT.2020.

Then, a grading/mastering unit 102 performs a grading or mastering process for photographed content, and linearly converts a code value and luminance, using a conversion table 151, to generate HDR master content. Further, metadata corresponding to the HDR master content, i.e., metadata including luminance information of the dynamic range, color information, and the like is generated.

Then, an optical-electrical conversion unit 103 non-linearly converts the luminance into a 10-bit code value, using an optical-electro transfer function (OETF) denoted with the reference number 152, and converts an optical linear luminance signal of the HDR master content into a display unit drive signal.

An encoding unit 104 encodes the HDR master content and its metadata to generate encoded data according to the MP4 format. The generated encoded data is recorded in a recording medium 200 through a recording unit 105. The MP4 file as a data storage file according to the MP4 format including the boxes that store the actual data and the metadata, which has been described with reference to FIGS. 1(a) and 1(b) and FIG. 2, is recorded in the recording medium 200.

Figure 4:
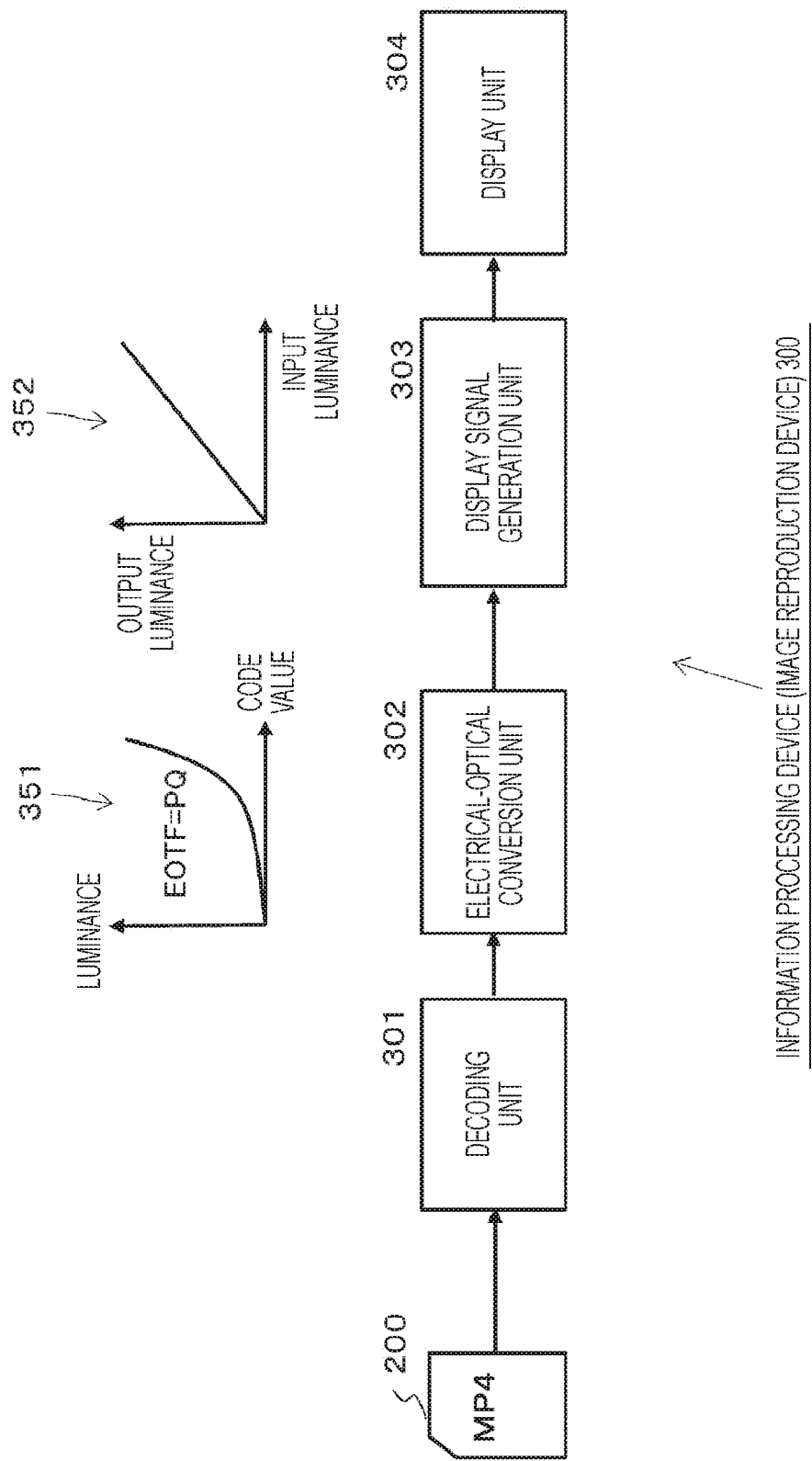
FIG. 4 is a diagram illustrating a configuration and a process example of an information processing device that reproduces MP4 format data.

FIG. 4 is a diagram illustrating a configuration example of an information processing device 300 as an image reproduction device that reads and reproduces the MP4 format data recorded in the recording medium 200.

A decoding unit 301 executes a process of decoding an encoded stream configured as the MP4 format data read from the recording medium 200 into an outputable signal (display unit drive signal) to a display device, and extracts the metadata.

Next, an electrical-optical linear conversion unit 302 converts the display unit drive signal including a decoded 10-bit code value into an optical linear luminance signal, using an electro-optical transfer function (EOTF) 351. For example, a dynamic range conversion process based on luminance information described in the metadata is performed for the optical linear luminance signal after the EOTF conversion.

Next, the display signal generation unit 303 generates a display unit drive signal in accordance with characteristics of a display panel, using a conversion table 352. In this process, a process using the metadata acquired from the MP4 file, and characteristic information acquired from a display unit 304 (outputable dynamic range information and color information, and the like) is executed.

For example, in a case where the characteristics of the display unit 304 cannot express the dynamic range of the HDR image stored in the recording medium 200, the display signal generation unit 303 performs display mapping to cause the dynamic range to be fit to the performance of the display unit 304, that is, a process of decreasing the dynamic range to be output, and the like.

The display unit 304 including a liquid crystal display panel and the like displays the content according to the display unit drive signal generated by the display signal generation unit 303.

Under present circumstances where various types of user devices (displays) are mixed, a situation where the dynamic range applied by the information processing device (image generation and recording device) 100 illustrated in FIG. 3 at the time of generating an image, and the dynamic range outputable (displayable) in the information processing device (image reproduction device) 300 illustrated in FIG. 4 are not matched is expected.

In such a case, the information processing device (image reproduction device) 300 illustrated in FIG. 4 needs display mapping to perform dynamic range conversion of the image to be fit to the performance of the display unit 304, that is, a process of decreasing the dynamic range to be output.

To execute such a process, a process of acquiring the metadata (attribute information) such as the dynamic range information of the image data recorded in the recording medium 200 from the MP4 file is needed.

In the present disclosure, a metadata storage region regarding the HDR content is defined in the MP4 format data. To be specific, an HDR image metadata box (hdrm box) is set.

The encoding unit 104 of the information processing device (image generation and recording device) 100 illustrated in FIG. 3 records the metadata regarding the HDR content to the hdrm box in generating the MP4 format data.

Further, the decoding unit 301 of the information processing device (image reproduction device) 300 illustrated in FIG. 4 reads the metadata regarding the HDR content from the hdrm box, and provides the read metadata to the electrical-optical linear conversion unit 302 and the display signal generation unit 303.

The electrical-optical linear conversion unit 302 and the display signal generation unit 303 become able to generate an optimum signal to be output to the display unit 304, using the metadata.

The metadata regarding the HDR image has the following two types of metadata:
 (1) static metadata; and
 (2) dynamic metadata.

The static metadata is unchanged metadata (attribute information) during one reproduction sequence such as one piece of content.

On the other hand, the dynamic metadata is metadata (attribute information) that is dynamically changed.

[3. Outline of HDR image metadata storage configuration in MP4 format of present disclosure]

In the configuration of the present disclosure, an HDR image metadata box (hdrm) is set as a metadata storage region regarding the HDR content for the MP4 format data.

The static metadata and the dynamic metadata are stored in the HDR image metadata box (hdrm).

An outline of the HDR image metadata storage configuration in the MP4 format of the present disclosure will be described with reference to FIGS. 5(A) and 5(B).

FIGS. 5(A) and 5(B) illustrate the following diagrams:
 (A) definition of the HDR image metadata box (hdrm); and
 (B) examples of recording data in the HDR image metadata box (hdrm).

As illustrated in the (A) definition of HDR image metadata box (hdrm), the HDR image metadata box (hdrm) set in the MP4 format data has the following setting:
 (1) a box name: HDR Metadata Box ('hdrm');
 (2) a box type:'hdrm';
 (3) a box serving as container: Track Box (trak box), or Track Fragment Box (traf box);
 (4) a mandatory box (Mandatory): No; and (5) the number (Quzntity): 0 or 1.

This definition information has the following meanings.
The HDR image metadata box is defined as hdrm box.
The hdrm box is set in the trak box or in the traf box of the MP4 file.
The hdrm box is not a mandatory configuration essential in the MP4 file.
Zero or one hdrm box is set in the trak box or the traf box of the MP4 file.

FIG. 5(B) illustrates examples of recording data in the HDR image metadata box (hdrm).

The following data are recorded in the HDR image metadata box (hdrm), for example:
 (1) a metadata identifier (metadata ID)
 (2) an electro-optical transfer function (EOTF);
 (3) color information (Mastering display color volume SEI information) calculated according to use display at the time of content editing (authoring);
 (4) maximum luminance of content (Maximum Content Light Level); and
 (5) a maximum value of frame average luminance of content (Maximum Frame-average Light Level).

Note that [unsigned int (n)] illustrated in FIG. 5(B) represents n-bit data of an unsigned integer.

For example, the HDR image metadata illustrated in FIG. 5(B) is recorded in the hdrm box of the MP4 format data.

Note that the example of the metadata illustrated in FIG. 5(B) is an example, and various other types of setting are available for the HDR image metadata recorded in the hdrm box.

[4. Specific storage example of HDR image metadata in MP4 format data]

Hereinafter, a specific storage example of the HDR image metadata in the MP4 format data will be described. Hereinafter, three examples will be described in order.

(First Example) an example of setting an HDR image metadata storage box [hdrm box] only to the trak box in the moov box in the MP4 format data.

(Second Example) an example of setting an HDR image metadata storage box [hdrm box] to both the trak box in the moov box and the traf box in the moof box in the MP4 format data.

(Third Example) an example of setting an HDR image metadata storage box [hdrm box] only to the traf box in the moof box in the MP4 format data.

Hereinafter, these examples will be described with reference to FIGS. 6 to 8.

[4-1. (First Example) Example of setting HDR image metadata storage box [hdrm box] only to trak box in moov box in MP4 format data]

First, the first example will be described with reference to FIG. 6.

Figure 6:
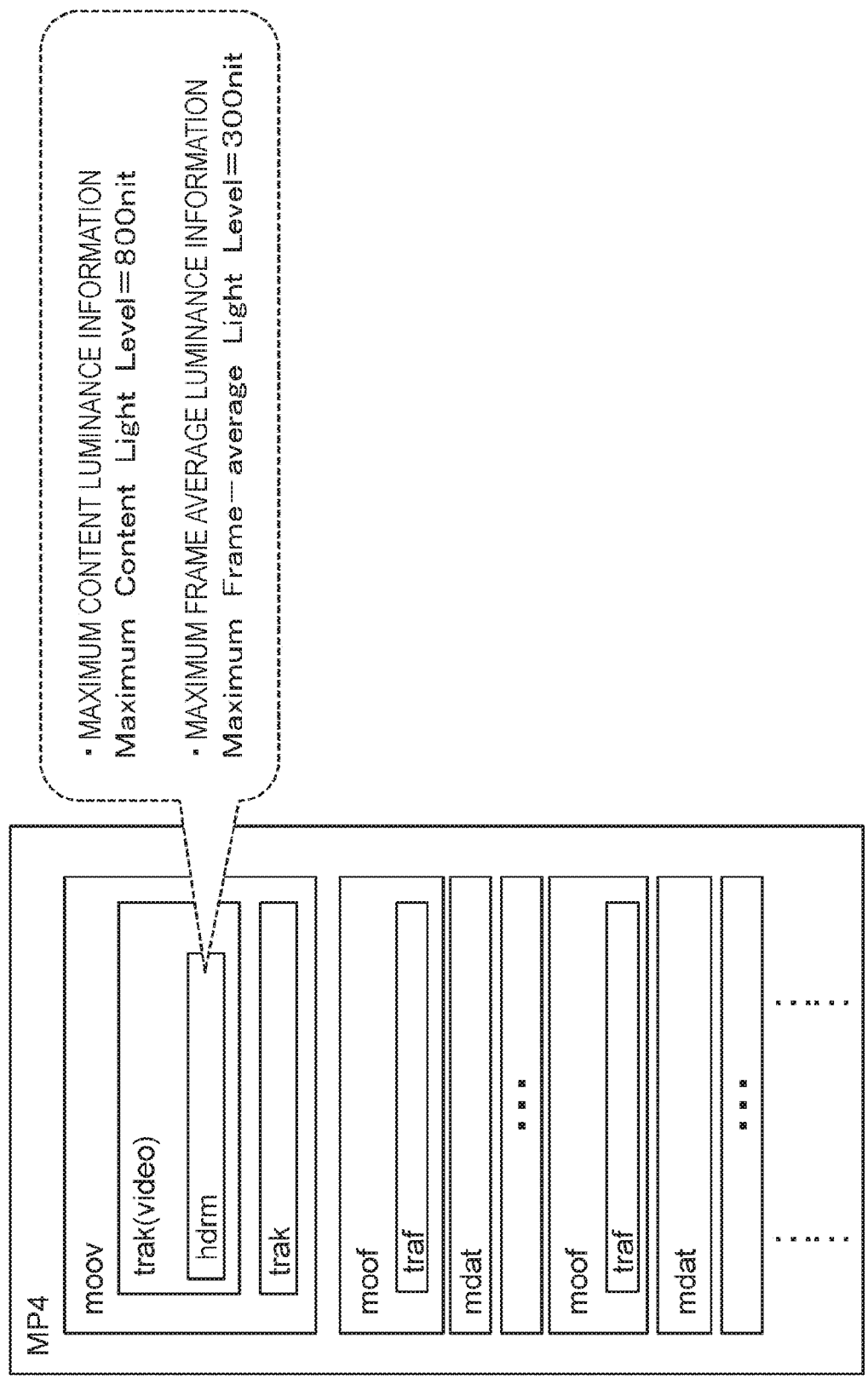
FIG. 6 is a diagram illustrating a storage configuration example of HDR image metadata for MP4 format data.

The first example is an example of setting an HDR image metadata storage box [hdrm box] only to the trak box in the moov box in the MP4 format data, as illustrated in FIG. 6.

As described with reference to FIGS. 1(a) and 1(b), the moov box is a box set as a storage region of the metadata such as the reproduction control information and the attribute information of data stored in the entire MP4 file.

One or more trak boxes are set in the moov box. The trak box can be set according to, for example, the types of data such as an image, audio, and subtitles and stores the metadata of the data.

In the MP4 file illustrated in FIG. 6, the trak box to which the HDR image metadata storage box [hdrm box] is set is a box set as a metadata storage region regarding an image.

The HDR image metadata storage box [hdrm box] is set in the trak box as the metadata storage box corresponding to the image.

In the HDR image metadata storage box [hdrm box], various metadata described with reference to FIG. 5(B) are stored, for example.

FIG. 6 illustrates an example of storing the following two data:

(1) maximum content luminance information (maximum content light level=800 nit); and (2) maximum frame average luminance information (maximum frame-average light level=300 nit).

These metadata indicate that the image (Video) data (=the HDR image data) stored in the MP4 file has:

the maximum luminance=800 nit; and the maximum frame average luminance=300 nit.

For example, the reproduction device that reproduces and outputs the image data stored in the MP4 file acquires an outputable luminance level of the display of the own device, determines whether the data having a luminance level recorded in the HDR image metadata is outputable, and outputs the HDR image stored in the MP4 file as it is when the data is outputable.

On the other hand, when the display of the reproduction device cannot output the data having a luminance level recorded in the HDR image metadata, the reproduction device executes a process of adjusting the luminance level of the image data stored in the MP4 file.

For example, a process of reducing the dynamic range of the HDR image stored in the mdat box of the MP4 file, and converting the HDR image into an image having a dynamic range outputable to the display unit (display) and outputting the image is executed.

[4-2. (Second Example) Example of setting HDR image metadata storage box [hdrm box] to both trak box in moov box and traf box in moof box in MP4 format data]

Next, the second example will be described with reference to FIG. 7.

Figure 7:
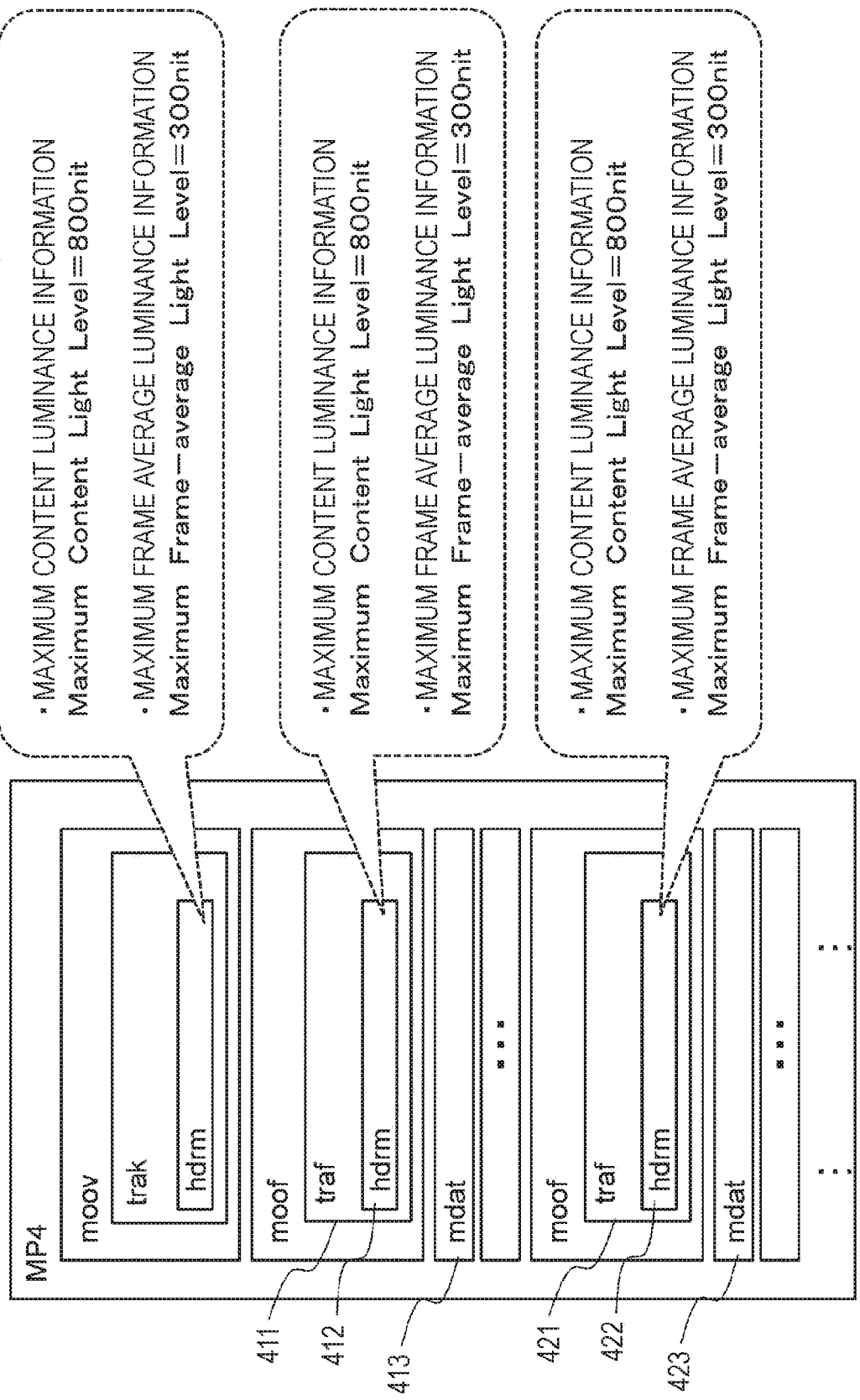
FIG. 7 is a diagram illustrating a storage configuration example of HDR image metadata for MP4 format data.

As illustrated in FIG. 7, the second example is an example of setting the HDR image metadata storage box [hdrm box] to both the trak box in the moov box and the traf box in the moof box in the MP4 format data.

As described with reference to FIGS. 1(a) and 1(b), the moov box is a box set as a storage region of the metadata such as the reproduction control information and the attribute information of data stored in the entire MP4 file.

One or more trak boxes are set in the moov box. The trak box can be set according to, for example, the types of data such as an image, audio, and subtitles and stores the metadata of the data.

Further, the moof box is a metadata storage box set corresponding to each mdat box as a fragmented data storage box of the fragmented actual data set to the MP4 file, that is, the image data that configures the content.

The traf box is set inside the moof box.

The metadata such as the reproduction control information and the attribute information of the actual data stored in the mdat box associated with the traf box is stored in the traf box.

In the MP4 file illustrated in FIG. 7, the HDR image metadata storage box [hdrm box] is set to:

the trak box; and the traf box.

In the HDR image metadata storage box [hdrm box] in the trak box, the HDR image metadata as metadata corresponding to the entire HDR image (Video) data included in the MP4 file is stored, similarly to the first example described with reference to FIG. 6.

Meanwhile, in the HDR image metadata storage box [hdrm box] in the traf box, the HDR image metadata as metadata corresponding only to the HDR image data in the mdat box associated with the traf box to which the hdrm box is set is stored.

A traf box 411 illustrated in FIG. 7 is a metadata storage box corresponding to the image data stored in an mdat box 413 as an image data storage box.

The HDR image metadata as metadata corresponding to the HDR image data stored in the mdat box 413 is stored in an hdrm box 412 set in the traf box 411.

Further, a traf box 421 illustrated in FIG. 7 is a metadata storage box corresponding to the image data stored in an mdat box 423 as an image data storage box, and the HDR image metadata as metadata corresponding to the HDR image data stored in the mdat box 423 is stored in an hdrm box 422 set in the traf box 421.

In the example illustrated in FIG. 7, in the HDR image metadata storage boxes [hdrm boxes] set to:

one trak box corresponding to the image; and a plurality of traf boxes corresponding to the image, various metadata described with reference to FIG. 5(B) are stored, for example.

The example illustrated in FIG. 7 illustrates an example of storing the following metadata common to all the HDR image metadata storage boxes [hdrm boxes] set to the one trak box corresponding to the image and the plurality of traf boxes in the MP4 file.

(1) maximum content luminance information (maximum content light level=800 nit); and (2) maximum frame average luminance information (maximum frame-average light level=300 nit)

The metadata in the hdrm box in the trak box indicates that the image (Video) included in the MP4 file has:

the maximum luminance=800 nit; and the maximum frame average luminance=300 nit.

Further, the metadata in the hdrm box in the traf box indicates that the image (Video) data included in the mdat box associated with the traf box has:

the maximum luminance=800 nit; and the maximum frame average luminance=300 nit.

For example, the reproduction device that reproduces and outputs the image data stored in the MP4 file acquires an outputable luminance level of the display of the own device, determines whether the data having a luminance level recorded in the HDR image metadata is outputable, and outputs the HDR image stored in the MP4 file as it is when the data is outputable.

On the other hand, when the display of the reproduction device cannot output the data having a luminance level recorded in the HDR image metadata, the reproduction device executes a process of adjusting the luminance level of the image data stored in the MP4 file.

For example, a process of reducing the dynamic range, and generating and outputting an image with a reduced dynamic range, of the image stored in the MP4 file, is executed.

Note that, in the configuration of the second example, in a case of reproducing only the image recorded in one mdat box, the hdrm box is taken out of the traf box associated with the mdat box to be reproduced, and the HDR image metadata corresponding to the data to be reproduced can be acquired by reference to the recorded data in the hdrm box.

[4-3. (Third Example) Example of setting HDR image metadata storage box [hdrm box] only to traf box in moof box in MP4 format data]

Next, a third example will be described with reference to FIG. 8.

Figure 8:
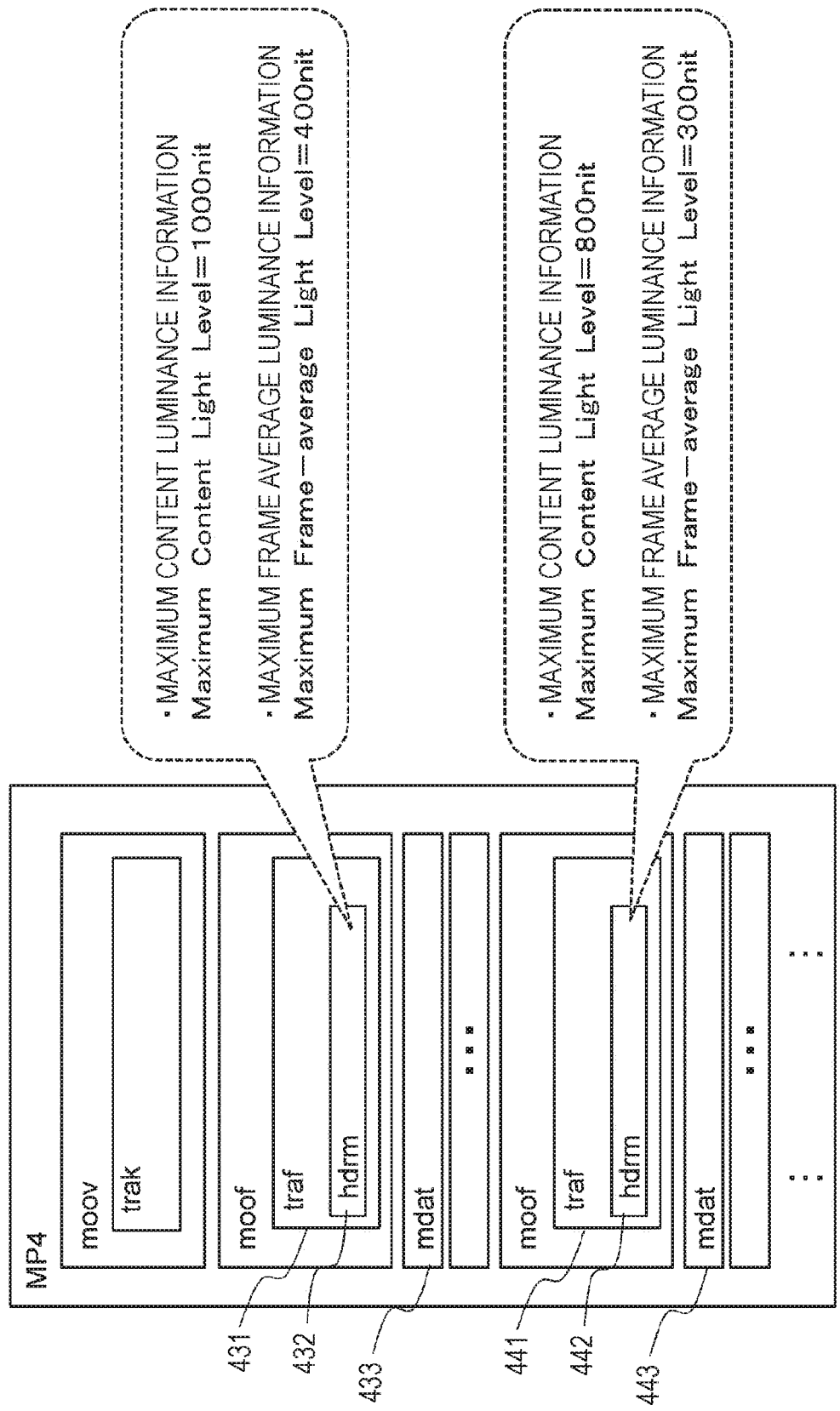
FIG. 8 is a diagram illustrating a storage configuration example of HDR image metadata for MP4 format data.

As illustrated in FIG. 8, the third example is an example of setting the HDR image metadata storage box [hdrm box] only to the traf box in the moof box in the MP4 format data.

As described with reference to FIGS. 1(*a*) and 1(*b*), the moof box is a metadata storage box set corresponding to each mdat box as a fragmented data storage box of the fragmented actual data set to the MP4 file, that is, the image data that configures the content.

The traf box is set inside the moof box.

The metadata such as the reproduction control information and the attribute information of the actual data stored in the mdat box associated with the traf box is stored in the traf box.

In the MP4 file illustrated in FIG. 8, the HDR image metadata storage box [hdrm box] is set only to the traf box.

In the HDR image metadata storage box [hdrm box] in the traf box, the HDR image metadata as metadata corresponding only to the image data in the mdat box associated with the traf box to which the hdrm box is set is stored.

A traf box 431 illustrated in FIG. 8 is a metadata storage box corresponding to the image data stored in an mdat box 433 as an image data storage box, and the HDR image metadata as metadata corresponding to the image data stored in the mdat box 433 is stored in an hdrm box 432 set in the traf box 431.

Further, a traf box 441 illustrated in FIG. 8 is a metadata storage box corresponding to the image data stored in an mdat box 443 as an image data storage box, and the HDR image metadata as metadata corresponding to the image data stored in the mdat box 443 is stored in an hdrm box 442 set in the traf box 441.

In the example illustrated in FIG. 8, various metadata described with reference to FIG. 5(B) are stored in the HDR image metadata storage boxes [hdrm boxes] set to the plurality of traf boxes corresponding to the image.

In the example illustrated in FIG. 8, the HDR image metadata stored in the hdrm boxes in the traf boxes are set as different data, unlike the configuration of the second example described with reference to FIG. 7.

In the hdrm box 432 set in the traf box 431, the following HDR image metadata is recorded as the metadata corresponding to the HDR image data stored in the mdat box 433:

(1) maximum content luminance information (maximum content light level=1000 nit); and (2) maximum frame average luminance information (maximum frame-average light level=400 nit).

Meanwhile, in the hdrm box 442 set in the another traf box 441, the following HDR image metadata is recorded as the metadata corresponding to the HDR image data stored in the mdat box 443:

(1) maximum content luminance information (maximum content light level=800 nit); and (2) maximum frame average luminance information (maximum frame-average light level=300 nit).

As described above, in the hdrm boxes 432 and 442 individually set to the different traf boxes 431 and 432, the different metadata regarding the image data stored in the mdat boxes 433 and 443 can be stored.

In the configuration of the third example, in a case of reproducing only the image recorded in one mdat box, the hdrm box is taken out of the traf box associated with the mdat box to be reproduced, and the HDR image metadata corresponding to the data to be reproduced can be acquired by reference to the recorded data in the hdrm box.

The configuration of the third example realizes a configuration to store the dynamic metadata described above, that is, the metadata according to an image form that is dynamically changed during a reproduction sequence.

[5. MP4 file generation and recording processes executed by information processing device and data reproduction process sequence from MP4 file]

Next, MP4 file generation and recording processes executed by the information processing device and a data reproduction process sequence from the MP4 file will be described with reference to FIGS. 9 and 10.

First, MP4 file generation and recording processes executed by the information processing device will be described with reference to the flowchart illustrated in FIG. 9.

The HDR image is stored in the MP4 file, and the HDR image metadata as metadata corresponding to the HDR image is further stored in the MP4 file.

Figure 9:
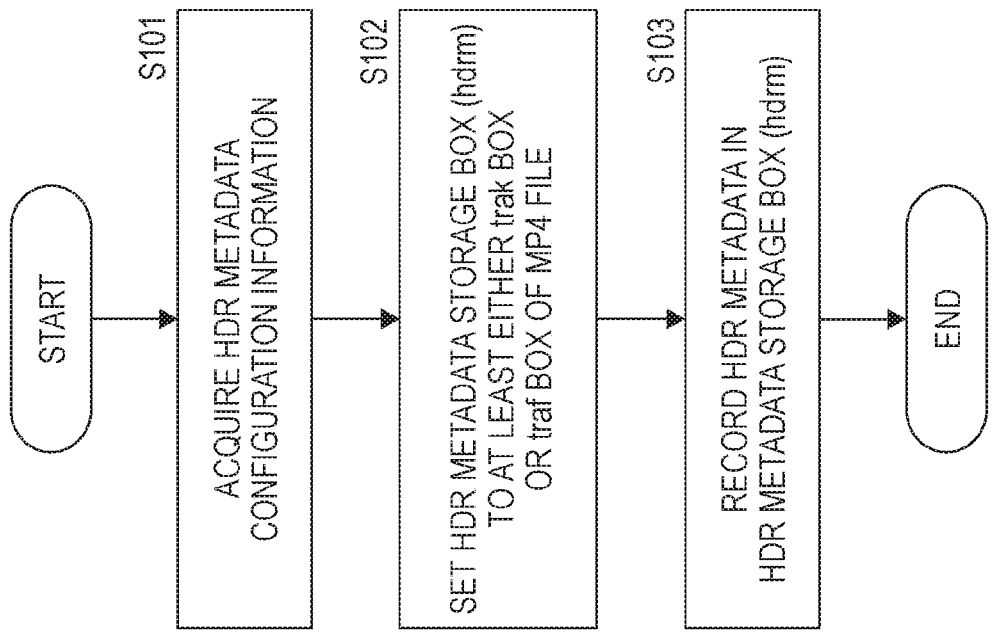
FIG. 9 is a diagram illustrating a flowchart for describing a process sequence to record HDR image metadata to MP4 format data.

The process according to the flowchart illustrated in FIG. 9 is executed under control of a data processing unit provided with a CPU having a program execution function and the like, according to a program stored in a storage unit of the information processing device.

Hereinafter, a process of steps of the flow illustrated in FIG. 9 will be described.

(Step S101)

First, the data processing unit of the information processing device acquires the metadata corresponding to the HDR image stored in the MP4 file.

This metadata is metadata generated at the time of generating the HDR image, and is configured from the data illustrated in FIG. 5(B), and the like.

(Step S102)

In step S102, the information processing device sets the HDR image metadata storage box (hdrm box) as a storage box of the metadata corresponding to the HDR image in either the trak box in the moov box or the traf box in the moof box of the MP4 file.

Note that, in a case where the metadata corresponding to the HDR image stored in the MP4 file acquired in step S101 is the metadata common to the HDR images stored in the MP4 file, that is, the static metadata described above, the hdrm box having setting illustrated in the first example (FIG. 6) or the second example (FIG. 7) may just be set.

That is, as illustrated in FIG. 6, one hdrm box is set in the trak box corresponding to the image in the moov box.

Alternatively, as illustrated in FIG. 7, one hdrm box is set in the trak box corresponding to the image in the moov box, and an hdrm box is further set in the traf box corresponding to the image in the moof box and is set to store the common HDR image metadata.

Further, in a case where the metadata corresponding to the HDR image stored in the MP4 file acquired in step S101 is not the metadata common to the HDR images stored in the MP4 file, that is, the metadata corresponding to only a part of image data, like the dynamic metadata described above, the hdrm box having the setting illustrated in the third example (FIG. 8) may just be set.

That is, as illustrated in FIG. 8, the hdrm box is set in the traf box in the moof box associated with the mdat box that stores the image data corresponding to the HDR image metadata is set, and the HDR image metadata specific to the image data stored in the mdat box is stored.

(Step S103)

Finally, in step S103, the information processing device records the metadata corresponding to the HDR image acquired in step S101 is recorded in the HDR image metadata storage box (hdrm box) in the MP4 file set in step S102.

Note that the flow in FIG. 9 illustrates only the storage process of the HDR image metadata. However, the information processing device stores the actual data such as the image, audio, and subtitles, and the metadata to the boxes such as the moov box, the moof box, and the mdat box set in the MP4 file to complete the MP4 file in generating the MP4 file.

Next, a process of the information processing device that executes a reproduction process of the HDR image stored in the MP4 file will be described with reference to the flowchart illustrated in FIG. 10.

The HDR image and its metadata (HDR image metadata) are stored in the MP4 file. The information processing device reads the HDR image metadata, confirms the dynamic range of the HDR image stored in the MP4 file, and the like, and executes an image output fit to the performance of the output display.

Figure 10:
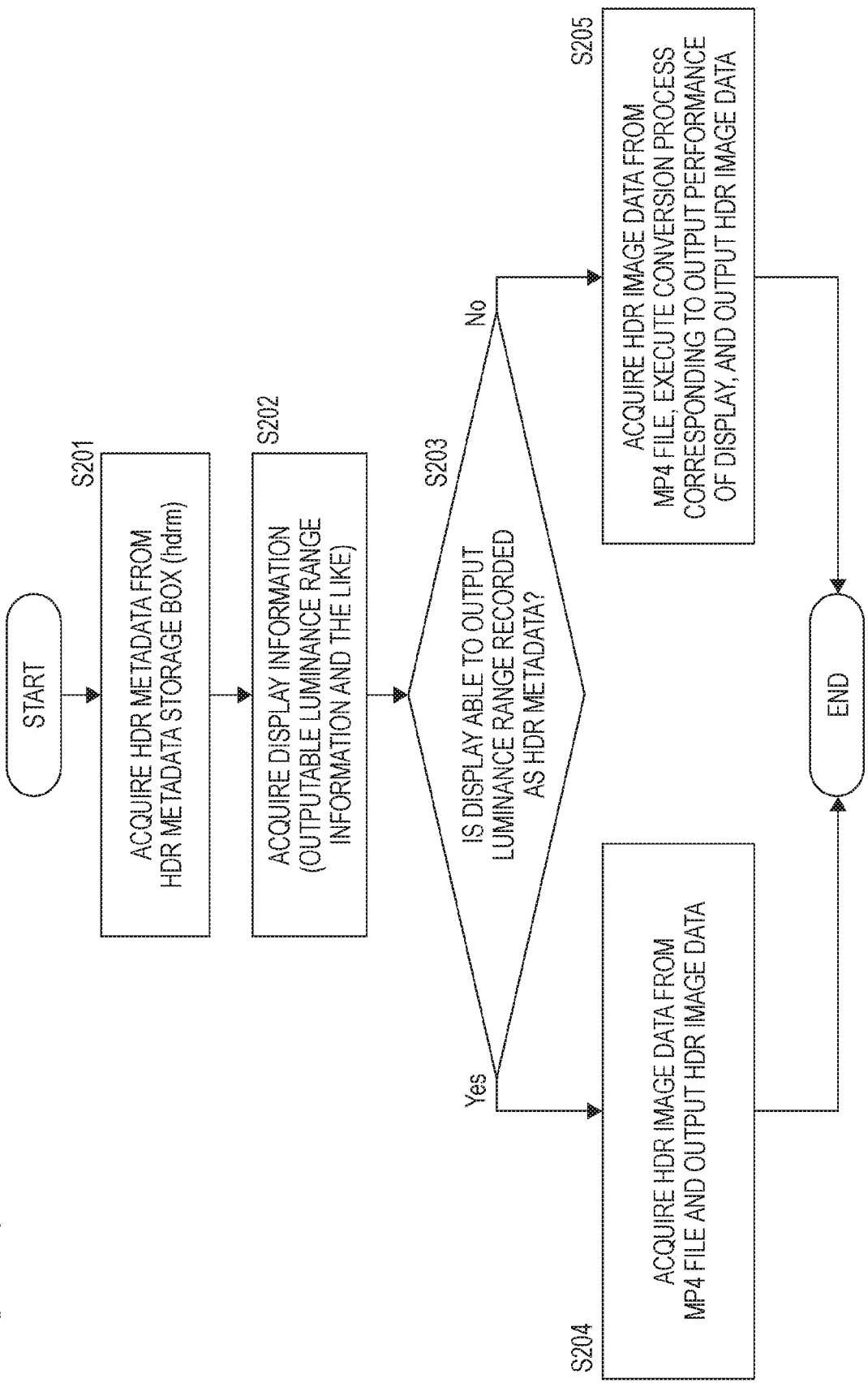
FIG. 10 is a diagram illustrating a flowchart for describing a process sequence to read and reproduce HDR image metadata from MP4 format data.

The process according to the flowchart illustrated in FIG. 10 is executed under control of a data processing unit provided with a CPU having a program execution function, and the like, according to a program stored in a storage unit of the information processing device.

Hereinafter, a process of steps of the flow illustrated in FIG. 10 will be described.

(Step S201)

First, the data processing unit of the information processing device acquires the metadata corresponding to the HDR image stored in the MP4 file from the HDR image metadata storage box (hdrm box).

Note that the acquisition source of the HDR image metadata may be different setting according to the data to be reproduced.

In a case of reproducing the entire image data stored in the MP4 file, the HDR image metadata may just be acquired from the HDR image metadata box (hdrm box) set in the trak box in the moov box.

Further, in a case of reproducing a part of the image data stored in the MP4 file, i.e., the image stored in a part of the mdat boxes in the MP4 file, the HDR image metadata corresponding to the partial image may just be acquired from the HDR image metadata box (hdrm box) set in the traf box in the moof box corresponding to the mdat box.

(Step S202)

Next, in step S202, the data processing unit of the information processing device acquires display unit information of the display unit (display) that executes the image output. To be specific, the data processing unit acquires outputable dynamic range information (outputable luminance range information) and the like.

For example, in a case where the information processing device is connected with the display unit through an HDMI (registered trademark) cable, the display unit information can be acquired through the HDMI (registered trademark) cable.

(Step S203)

In step S203, the data processing unit of the information processing device determines whether the display unit can output the HDR image in the dynamic range stored in the MP4 file.

This determination process is executed on the basis of the HDR image metadata acquired from the HDR image metadata storage box (hdrm box) in step S201, and the display unit information acquired from the display unit in step S202.

When the data processing unit determines that the display unit can output the HDR image in the dynamic range of the image data stored in the MP4 file, the determination of step S203 is made Yes, and the process proceeds to step S204.

Meanwhile, when the data processing unit determines that the display unit can output the dynamic range of the image data stored in the MP4 file, the determination of step S203 is made No, and the process proceeds to step S205.

(Step S204)

When the data processing unit determines that the display unit can output the HDR image in the dynamic range stored in the MP4 file in the determination process in step S203, the data processing unit acquires the HDR image from the mdat box of the MP4 file, decodes the HDR image, and outputs the image to the display unit in step S204.

(Step S205)

When the data processing unit determines that the display unit cannot output the HDR image in the dynamic range stored in the MP4 file in the determination process of step S203, the data processing unit acquires the HDR image from the mdat box of the MP4 file, decodes the HDR image, further executes the dynamic range conversion process for causing the image to be fit to the display performance of the display unit, and outputs an image signal after the conversion process to the display unit, in step S205.

To be specific, the data processing unit generates the image signal in which the dynamic range of the image stored in the MP4 file is decreased, and outputs the image signal to the display unit.

By this process, the image fit to the display performance of the display unit can be output.

[6. Example of hardware configuration of information processing device]

Next, a specific hardware configuration example of the information processing device according to an embodiment of the present disclosure will be described with reference to FIG. 11.

Figure 11:
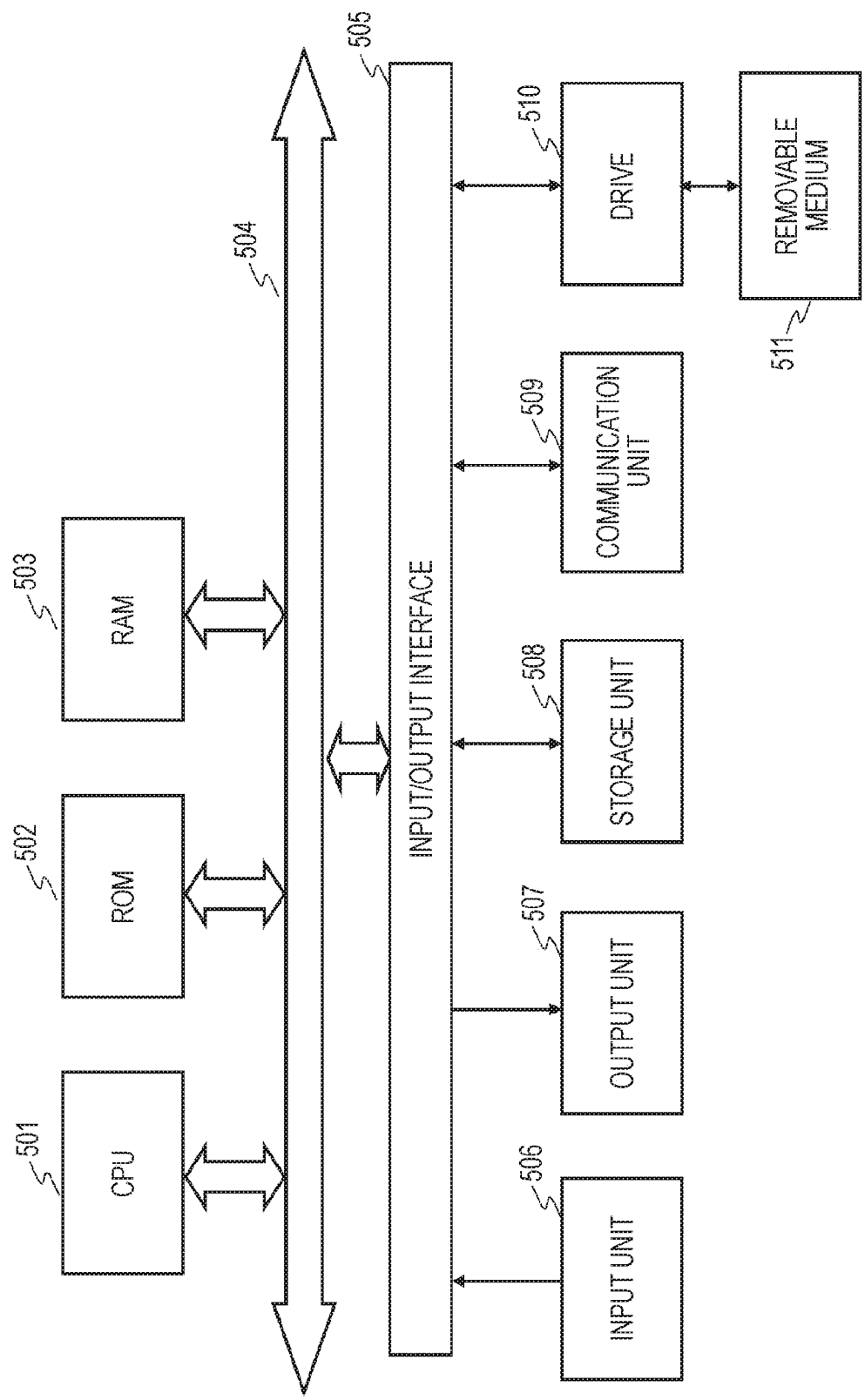
FIG. 11 is a diagram illustrating a configuration example of an information processing device.

FIG. 11 is a block diagram illustrating a configuration example of an information processing device 500 according to an embodiment of the present disclosure. The hardware configuration example of the information processing device is applicable as a reproduction device, an information generation device, or a recording device.

That is, for example, a device that generates data according to the MP4 format data, a device that records generated data in a medium such as a flash memory, or a device that reads and reproduces data according to the MP4 format recorded in the medium such as a flash memory.

A central processing unit (CPU) 501 functions as a data processing unit that performs various processes according to a program stored in a read only memory (ROM) 502 or a storage unit 508. For example, the CPU 501 executes the process according to the sequences described in the above-described embodiments. A random access memory (RAM) 503 stores a program executed by the CPU 501, data, and the like. The CPU 501, the ROM 502, and the RAM 503 are connected to one another by a bus 504.

The CPU 501 is connected to an input/output interface 505 via the bus 504. An input unit 506 including various switches, a keyboard, a mouse, a microphone, or the like and an output unit 507 including a display, a speaker, or the like are connected to the input/output interface 505. The CPU 501 performs various processes corresponding to instructions input from the input unit 506 and outputs process results to, for example, the output unit 507.

The storage unit 508 connected to the input/output interface 505 is including, for example, a hard disk and stores the program executed by the CPU 501 and various kinds of data. The communication unit 509 functions as a transmission and reception unit of data communication via a network such as the Internet or a local area network and a transmission and reception unit of broadcast waves, and performs communication with an external device.

A drive 510 connected to the input/output interface 505 drives a removable medium 511 such as a magnetic disk, an optical disk, a magneto-optical disk, or a semiconductor memory such as a memory card, and records or reads data.

Note that encoding or decoding of data can be executed as processes of the CPU 501 as a data processing unit. However, a configuration provided with a codec as dedicated hardware that executes an encoding process or a decoding process may be employed.

Note that, for example, in a device that performs the generation process and the reproduction process of the MP4 data described with reference to FIGS. 3 and 4, encoding, decoding, and other data conversion processes can be executed in the CPU 501 that functions as a data processing unit, using the program, the conversion table, and the like stored in the storage unit 508, in the configuration illustrated in FIG. 11.

[7. Conclusion of configurations of present disclosure]

The embodiments of the present disclosure have been described in detail with reference to the specific embodiments. However, it should be apparent that those skilled in the art can make corrections or substitutions of the embodiments without departing from the gist of the present disclosure. That is, the present disclosure has been disclosed in exemplary forms, and should not be construed in a limited manner. To determine the gist of the present disclosure, the claims should be taken into account.

Note that the technology disclosed in the present specification can employ the configurations below.

(1) An information processing device including:

a data processing unit configured to read high dynamic range (HDR) image data from an MP4 file that stores data according to an MP4 format and output the HDR image data to a display unit, wherein the data processing unit acquires HDR image metadata as metadata regarding the HDR image data stored in the MP4 file, determines whether executing a conversion process of an HDR image read from the MP4 file according to the acquired HDR image metadata and display function information of the display unit, and executes an output image generation process according to a determination result.

(2) The information processing device according to (1), wherein the data processing unit acquires a dynamic range of the HDR image stored in the MP4 file from the HDR image metadata acquired from the MP4 file, determines whether the display unit is able to output the HDR image having the dynamic range stored in the MP4 file, and executes an image conversion process of decreasing the dynamic range of the HDR image stored in the MP4 file and outputting the HDR image to the display unit when the display unit is not able to output the HDR image.

(3) The information processing device according to (1) or (2), wherein the HDR image metadata is recorded in an HDR image metadata storage box in a trak box that stores metadata to be applied to the entire HDR image stored in the MP4 file, and the data processing unit reads the HDR image metadata from the HDR image metadata storage box in the trak box, applies the read metadata, determines whether executing the conversion process of an HDR image read from the MP4 file, and executes the output image generation process according to a determination result.

(4) The information processing device according to any of (1) to (3), wherein the HDR image metadata is recorded in an HDR image metadata storage box in a traf box that stores metadata to be applied to the HDR image stored in an mdat box as a fragmented image storage region set to the MP4 file, and the data processing unit reads the HDR image metadata from the HDR image metadata storage box in the traf box associated with the mdat box that stores the HDR image supposed to be output, applies the read metadata, determines whether executing the conversion process of the HDR image supposed to be output read from the mdat box, and executes the output image generation process according to a determination result.

(5) An information processing device including:

a data processing unit configured to generate an MP4 file that stores high dynamic range (HDR) image data according to an MP4 format, wherein the data processing unit generates or acquires HDR image metadata as metadata regarding the HDR image data stored in the MP4 file, and sets an HDR image metadata storage box in the MP4 file, and stores the HDR image metadata in the set HDR image metadata storage box.

(6) The information processing device according to (5), wherein the data processing unit records, to the HDR image metadata storage box, the HDR image metadata including maximum luminance information of the HDR image data stored in the MP4 file.

(7) The information processing device according to (5) or (6), wherein
the data processing unit records the HDR image metadata to the HDR image metadata storage box in a trak box that stores metadata to be applied to an entire HDR image stored in the MP4 file.

(8) The information processing device according to any of (5) to (7), wherein
the data processing unit records the HDR image metadata to the HDR image metadata storage box in a traf box that stores metadata to be applied to an HDR image stored in an mdat box as a fragmented image storage region set to the MP4 file.

(9) An information recording medium that records an MP4 file that stores data according to an MP4 format,
the information recording medium including:
an mdat box that stores high dynamic range (HDR) image data; and
an HDR image metadata storage box that stores HDR image metadata as metadata corresponding to the HDR image, as recorded data,
the information recording medium enabling
a reproduction device, which reads and reproduces HDR image data from the MP4 file, to determine whether executing a conversion process of an image on the basis of the HDR image metadata read from the HDR image metadata storage box.

(10) The information recording medium according to (9), wherein the HDR image metadata is configured to be recorded in the HDR image metadata storage box in a trak box that stores metadata to be applied to the entire HDR image stored in the MP4 file.

(11) The information recording medium according to (9) or (10), wherein
the HDR image metadata is configured to be recorded in the HDR image metadata storage box in a traf box that stores metadata to be applied to the HDR image stored in the mdat box as a fragmented image storage region set to the MP4 file.

(12) An information processing method executed in an information processing device,
the information processing device including a data processing unit that reads high dynamic range (HDR) image data from an MP4 file that stores data according to an MP4 format, and outputs the HDR image data to a display unit,
the data processing unit being configured to
acquire HDR image metadata as metadata regarding the HDR image data stored in the MP4 file, and
determine whether executing a conversion process of an HDR image read from the MP4 file according to the acquired HDR image metadata and display function information of the display unit, and execute an output image generation process according to a determination result.

(13) An information processing method executed in an information processing device,
the information processing device including a data processing unit that generates an MP4 file that stores high dynamic range (HDR) image data according to an MP4 format,
the data processing unit being configured to
generate or acquire HDR image metadata as metadata regarding the HDR image data stored in the MP4 file, and
set an HDR image metadata storage box in the MP4 file, and store the HDR image metadata to the set HDR image metadata storage box.

(14) A program for causing an information processing device to execute an information process,
the program causing a data processing unit of the information processing device to execute a data process of reading high dynamic range (HDR) image data from an MP4 file that stores data according to an MP4 format, and outputting the HDR image data to a display unit,
the program causing the data processing unit, in the data process,
to acquire HDR image metadata as metadata regarding the HDR image data stored in the MP4 file, and
to determine whether executing a conversion process of an HDR image read from the MP4 file according to the acquired HDR image metadata and display function information of the display unit, and to execute an output image generation process according to a determination result.

(15) A program for causing an information processing device to execute an information process,
the program causing a data processing unit of the information processing device to execute a data process of generating an MP4 file that stores high dynamic range (HDR) image data according to an MP4 format,
the program causing the data processing unit, in the data process,
to generate or acquire HDR image metadata as metadata regarding the HDR image data stored in the MP4 file, and
to set an HDR image metadata storage box in the MP4 file, and to execute a process of storing the HDR image metadata to the set HDR image metadata storage box.

Further, the series of processes described in the specification can be executed by hardware, software, or a combined configuration of both the hardware and the software. In a case where the processes are executed by software, a program that records the process sequence can be installed and executed on a memory inside a computer incorporated in dedicated hardware or the problem can be installed and executed on a general computer capable of executing various processes. For example, the program can be recorded in advance on a recording medium. The program can be installed on a computer from a recording medium, or can also be received via a network such as a local area network (LAN) or the Internet, and installed to a recording medium such as a built-in hard disk.

Note that the various processes described in the present specification may be chronologically executed according to the description and may also be executed in parallel or in an individual manner according to the processing capability of a device that executes the processes or as needed. Further, in the present specification, a system is a logical set configuration of a plurality of devices and is not limited to a configuration in which the plurality of devices is located in the same casing.

INDUSTRIAL APPLICABILITY

As described above, according to the configuration of an embodiment of the present disclosure, the HDR image and the HDR image metadata are stored in the MP4 file, and the reproduction device can reproduce an optimum HDR image based on metadata.

To be specific, for example, the HDR image metadata is recorded in the MP4 file in generating the MP4 file that stores the HDR image data. The HDR image metadata storage box is set in the trak box or the traf box in the MP4 file, and the HDR image metadata is stored. The reproduction device acquires the HDR image metadata stored in the MP4 file, determines whether executing the conversion process of the HDR image read from the MP4 file according to the acquired metadata and the display function information of the display unit, and executes the output image generation process according to the determination result.

With the present configuration, the HDR image and the HDR image metadata are stored in the MP4 file, and the reproduction device can reproduce an optimum HDR image based on metadata.

REFERENCE SIGNS LIST

100 Information processing device (image generation and recording device)
101 Photographing unit
102 Grading/mastering unit
103 Optical-electrical conversion unit
104 Encoding unit
105 Recording unit
200 Recording medium
300 Information processing device (image reproduction device)
301 Decoding unit
302 Electrical-optical conversion unit
303 Display signal generation unit
304 Display unit
501 CPU
502 ROM
503 RAM
504 Bus
505 Input/output interface
506 Input unit
507 Output unit
508 Storage unit
509 Communication unit
510 Drive
511 Removable medium

The invention claimed is:

1. An information processing device, comprising:
a data processing unit configured to:
acquire high dynamic range (HDR) image metadata from an MP4 file, wherein
the acquired HDR image metadata includes a maximum value of frame average luminance of HDR image data stored in the MP4 file, and
the HDR image data stored in the MP4 file is based on an MP4 format;
acquire display function information of a display unit from the display unit;
read the HDR image data from the MP4 file;
execute a conversion process of the read HDR image data based on the acquired HDR image metadata and the acquired display function information of the display unit;
execute an output image generation process based on the execution of the conversion process; and
output an image signal to the display unit based on the executed output image generation process.

2. The information processing device according to claim 1, wherein
the data processing unit is further configured to:
acquire a dynamic range of the HDR image data stored in the MP4 file from the acquired HDR image metadata;
determine the HDR image data having the dynamic range is not outputable by the display unit, wherein the determination is based on the acquired HDR image metadata and the acquired display function information of the display unit;
execute the conversion process of the read HDR image data based on the determination,
wherein the conversion process includes reduction of the dynamic range of the HDR image data; and
output the HDR image data with the reduced dynamic range to the display unit.

3. The information processing device according to claim 1, wherein
the HDR image metadata is recorded in an HDR image metadata storage box,
the HDR image metadata storage box is in a trak box in the MP4 file,
the trak box stores metadata for application of an entire HDR image stored in the MP4 file, and
the data processing unit is further configured to read the HDR image metadata from the HDR image metadata storage box.

4. The information processing device according to claim 1, wherein
the HDR image metadata is recorded in an HDR image metadata storage box in a traf box that stores metadata to be applied to the HDR image data stored in an mdat box as a fragmented image storage region set to the MP4 file, and
the data processing unit is further configured to:
read the HDR image metadata from the HDR image metadata storage box in the traf box associated with the mdat box that stores the HDR image data supposed to be output;
apply the read HDR image metadata;
determine whether executing the conversion process of the HDR image data supposed to be output read from the mdat box; and
execute the output image generation process according to a determination result.

5. An information processing device, comprising:
a data processing unit configured to:
generate an MP4 file that stores high dynamic range (HDR) image data;
acquire HDR image metadata associated with the HDR image data, wherein
the HDR image data stored in the MP4 file is based on an MP4 format, and
the acquired HDR image metadata includes a maximum value of frame average luminance of the HDR image data stored in the MP4 file;
set an HDR image metadata storage box in the MP4 file; and
store the HDR image metadata in the set HDR image metadata storage box.

6. The information processing device according to claim 5, wherein
the HDR image metadata further includes maximum luminance information of the HDR image data.

7. The information processing device according to claim 5, wherein
the HDR image metadata storage box is in a trak box in the MP4 file, and
the trak box stores metadata for application of an entire HDR image stored in the MP4 file.

8. The information processing device according to claim 5, wherein
the data processing unit is further configured to record the HDR image metadata to the HDR image metadata storage box in a traf box that stores metadata to be applied to the HDR image data stored in an mdat box as a fragmented image storage region set to the MP4 file.

9. A non-transitory computer-readable medium having stored thereon an MP4 file and computer-executable instructions, the computer-executable instructions, when executed by a processor of a reproduction device, cause the processor to execute operations, the operations comprising:
reading high dynamic range (HDR) metadata from an HDR image metadata storage box of the MP4 file, wherein
an mdat box of the MP4 file stores HDR image data;
the HDR image metadata storage box of the MP4 file stores the HDR image metadata corresponding to the HDR image data,
the stored HDR image data is based on an MP4 format, and
the stored HDR image metadata includes a maximum value of frame average luminance of the HDR image data;
executing a conversion process of the HDR image data based on the read HDR image metadata; and
reproducing the HDR image data based on the execution of the conversion process.

10. The non-transitory computer-readable medium according to claim 9, wherein
the HDR image metadata storage box is in a trak box, and
the trak box stores metadata for application of an entire HDR image stored in the MP4 file.

11. The non-transitory computer-readable medium according to claim 9, wherein
the HDR image metadata is configured to be recorded in the HDR image metadata storage box in a traf box that stores metadata to be applied to the HDR image data stored in the mdat box as a fragmented image storage region set to the MP4 file.

12. An information processing method comprising:
in an information processing device:
acquiring, by a data processing unit of the information processing device, high dynamic range (HDR) image metadata from an MP4 file, wherein
the acquired HDR image metadata includes a maximum value of frame average luminance of HDR image data stored in the MP4 file, and
the HDR image data stored in the MP4 file is based on an MP4 format;
acquiring, by the data processing unit, display function information of a display unit from the display unit;
reading, by the data processing unit, the HDR image data from the MP4 file;
executing, by the data processing unit, a conversion process of the read HDR image data based on the acquired HDR image metadata and the acquired display function information of the display unit;
executing, by the data processing unit, an output image generation process based on the execution of the conversion process; and
outputting, by the data processing unit, an image signal to the display unit based on the executed output image generation process.

13. An information processing method comprising:
in an information processing device:
generating, by a data processing unit of the information processing device, an MP4 file that stores high dynamic range (HDR) image data;
acquiring, by the data processing unit, HDR image metadata associated with the HDR image data, wherein
the HDR image data stored in the MP4 file is based on an MP4 format, and
the acquired HDR image metadata includes a maximum value of frame average luminance of the HDR image data stored in the MP4 file;
setting, by the data processing unit, an HDR image metadata storage box in the MP4 file; and
storing, by the data processing unit, the HDR image metadata in the set HDR image metadata storage box.

14. A non-transitory computer-readable medium having stored thereon computer-executable instructions that, when executed by a processor of an information processing device, cause the processor to execute operations, the operations comprising:
acquiring high dynamic range (HDR) image metadata from an MP4 file, wherein
the acquired HDR image metadata includes a maximum value of frame average luminance of HDR image data stored in the MP4 file, and
the HDR image data stored in the MP4 file is based on an MP4 format,
acquiring display function information of a display unit from the display unit;
reading the HDR image data from the MP4 file;
executing a conversion process of the read HDR image data based on the acquired HDR image metadata and the acquired display function information of the display unit;
executing an output image generation process based on the execution of the conversion process; and
outputting an image signal to the display unit based on the executed output image generation process.

15. A non-transitory computer-readable medium having stored thereon computer-executable instructions that, when executed by a processor of an information processing device, cause the processor to execute operations, the operations comprising:
generating an MP4 file that stores high dynamic range (HDR) image data;
acquiring HDR image metadata associated with the HDR image data, wherein
the HDR image data stored in the MP4 file is based on an MP4 format, and
the acquired HDR image metadata includes a maximum value of frame average luminance of the HDR image data stored in the MP4 file;
setting an HDR image metadata storage box in the MP4 file; and
storing the HDR image metadata in the set HDR image metadata storage box.

* * * * *